Figure 1:
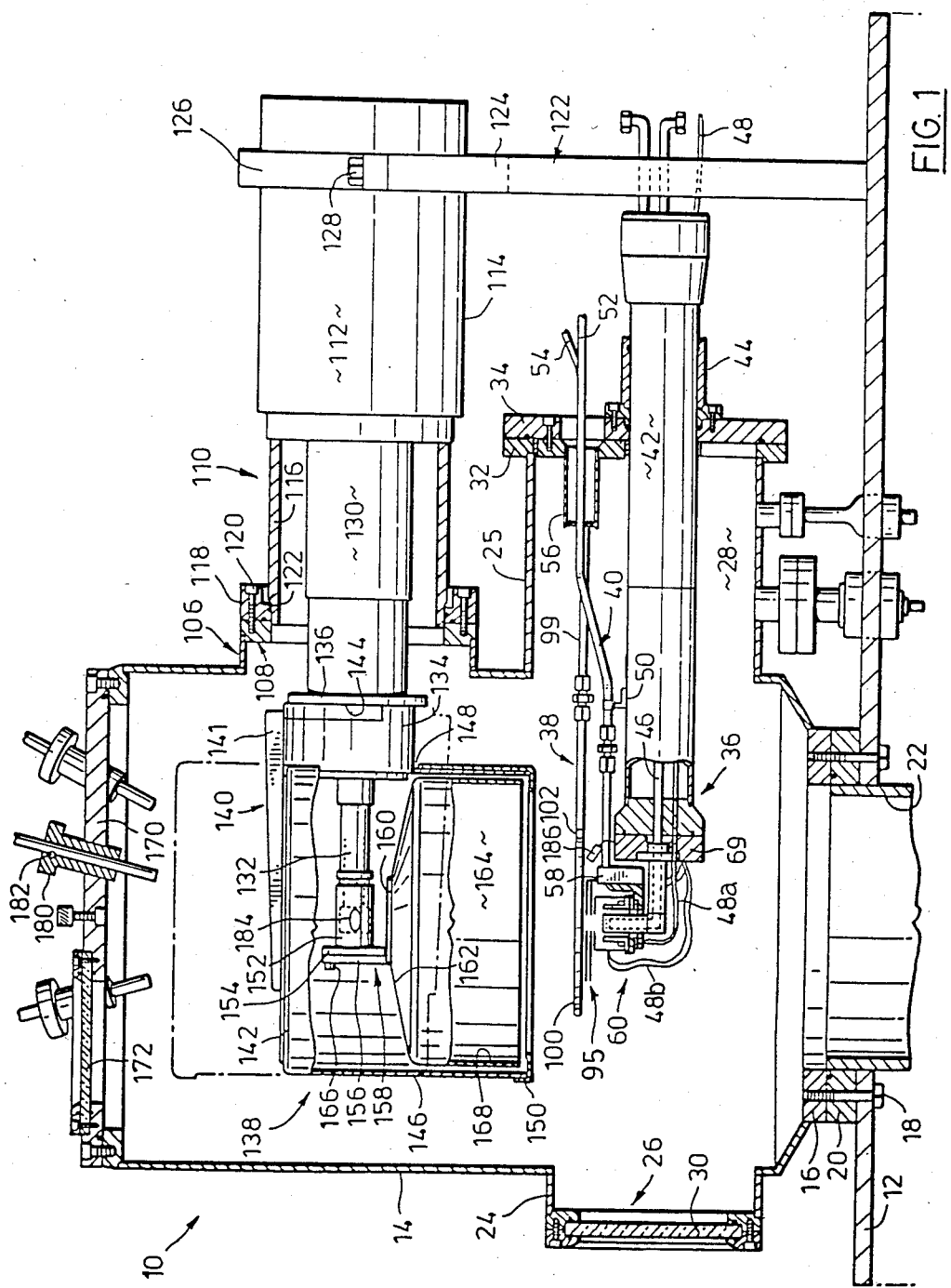

United States Patent [19]

Ozin et al.

[11] Patent Number: 4,599,869
[45] Date of Patent: Jul. 15, 1986

[54] CRYOGENIC DEPOSITION OF CATALYSTS

[76] Inventors: Geoffrey A. Ozin, 63 Gormley Ave., Toronto, Ontario, Canada, M4V 1Y9; Karl Molnar, 3 Woodglen Way, Unionville, Ontario, Canada, L3R 3A8

[21] Appl. No.: 588,616

[22] Filed: Mar. 12, 1984

[51] Int. Cl.$^4$ ............................................. B01D 8/00
[52] U.S. Cl. ..................................... 62/55.5; 55/269; 62/268; 219/121 ET; 219/121 EZ; 417/901
[58] Field of Search ................. 62/55.5, 100, 268; 55/269; 417/901; 219/121 ET, 121 EZ

[56] References Cited

U.S. PATENT DOCUMENTS

| | | | |
|---|---|---|---|
| 2,879,157 | 3/1959 | Batutis et al. | 62/55.5 |
| 3,395,279 | 7/1968 | Moore | 219/121 EZ |
| 3,558,878 | 1/1971 | Neuhaus | 219/121 EZ |
| 3,655,902 | 4/1972 | Firestone et al. | 219/121 EZ |
| 4,034,181 | 7/1977 | Packard | 219/121 EZ |
| 4,464,905 | 4/1984 | Dittrich et al. | 62/55.5 |
| 4,488,964 | 12/1984 | Mitsutsuka | 62/55.5 |

Primary Examiner—Ronald C. Capossela
Attorney, Agent, or Firm—Hirons, Rogers & Scott

[57] ABSTRACT

A reactor for performing reactions at very low, i.e. cryogenic temperatures has a collection vessel mounted above an electron gun to collect vaporized material such as metals, metal oxides, metal salts and metal halides. The collection vessel is maintained at a very low temperature, typically between 14° and 77° K., by a heat pump that also serves as a support for the collection vessel. A manifold introduces a reagent into the reactor between the electron gun and the vessel to react with the vaporized material and form a product. The product is condensed on the collection vessel which may then be inverted to provide a stable support for the collected product during further experimentation.

42 Claims, 3 Drawing Figures

CRYOGENIC DEPOSITION OF CATALYSTS

The present invention relates to a reactor for performing reactions at very low, i.e. cryogenic temperatures and is particularlary suitable for preparing organo metallic compounds and catalysts in small cluster form, i.e. between 1 and 50 metal atoms.

The mannner in which many catalyst materials operate is not fully understood. It is appreciated however that the characteristics of the material are different when atoms of the material are isolated in small cluster form than when the material is present in bulk.

The investigation of ultrafinely dispersed metal cluster catalyst material has been hindered by the natural tendency for the small clusters to coalesce. To avoid this attempts have been made to isolate the small clusters by forming them at very low temperatures where the mobility of the atoms is reduced. One such technique utilises a rotatable flask having an electron gun and carrier liquid within the bulb of the flask. The flask is evacuated to remove spurious gas that may react with the catalyst and the bulb is immersed in a refrigerant bath to depress the temperature and vapour pressure of the liquid within the bulb. The electron gun is used to vaporise a sample of the metal contained in the flask and, as vaporisation occurs, the flask is rotated to spread a thin film of the carrier liquid over the inner surface of the flask. The metal atoms freed by vaporisation of the bulk metal are captured by the carrier liquid before they coalesce so that atoms or small clusters of the metal are deposited throughout the carrier liquid to provide the desired product. The product may then be used for further experimentation or used to transfer the small atomic or small cluster product to a different support.

Whilst this arrangement has proved satisfactory for a large number of investigations it is limited because the carrier must be in a liquid form in order to spread a thin film of carrier for collection of the metal atoms. Moreover the need to rotate the flask to spread the thin film limits the coolant that can be used to extract the heat from the flask so that the temperature that can be obtained within the rotating flask is not low enough to permit the formation of products involving reagents which are non condensable at liquid nitrogen temperatures.

It is therefore an object of the invention to obviate or mitigate the above disadvantages.

According therefore to the present invention there is provided a reactor comprising a housing, means within said housing to locate a material, vaporising means to vaporise said material, collection means positioned above said location means to collect vaporised material on a surface thereof directed toward said location means, support means to support said collection means within said housing and heat extraction means to extract heat from said collection means and maintain said surface at a predetermined temperature, said support means permitting movement of said collection means from a first position in which said surface is directed toward said location means to a second position in which said surface is directed away from said location means whereby material deposited on said surface is supported in a stable manner when said surface is in said second position.

Preferably means are provided to introduce a reactant into said housing between said vaporising means and said collection means so that said reactant and said vaporised material co-condense on said collection means.

By providing an invertable collection means that is stationary during deposition of the product it is possible to extract heat from the collection means by a heat pump and so maintain the temperature at a much lower value than liquid nitrogen temperatures.

According to a further aspect of the present invention there is provided a method of preparing a product comprising the steps of vaporising a first material, reacting said first material with a reactant to form said product and collecting said product on a collection device maintained at a temperature below the condensation temperature to condense both the material and reactant.

A further problem associated with prior devices is that the vapour pressure around the electron gun may increase to a level where the electron emission stops, i.e. arcing occurs.

Therefore according also to the present invention there is provided an electron gun assembly comprising a hearth, a focussing screen encompassing said hearth and spaced therefrom, a filament located between said hearth and said screen and extending around said hearth, means to supply a potential difference between said filament and said hearth to induce the flow of electrons from said filament to said hearth and means to reduce locally the pressure of the atmosphere within said screen.

An embodiment of the invention will now be described by way of example only with reference to the accompanying drawings in which FIG. 1 is a side elevation in section of a reactor for performing reactions at very low temperatures.

Figure 2:
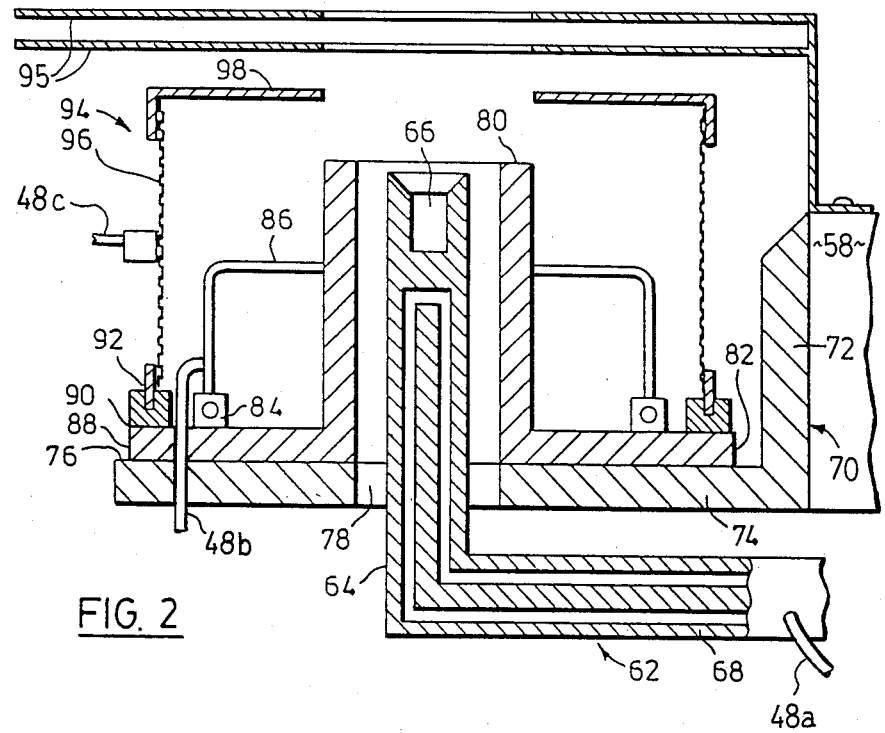
Figure 3:
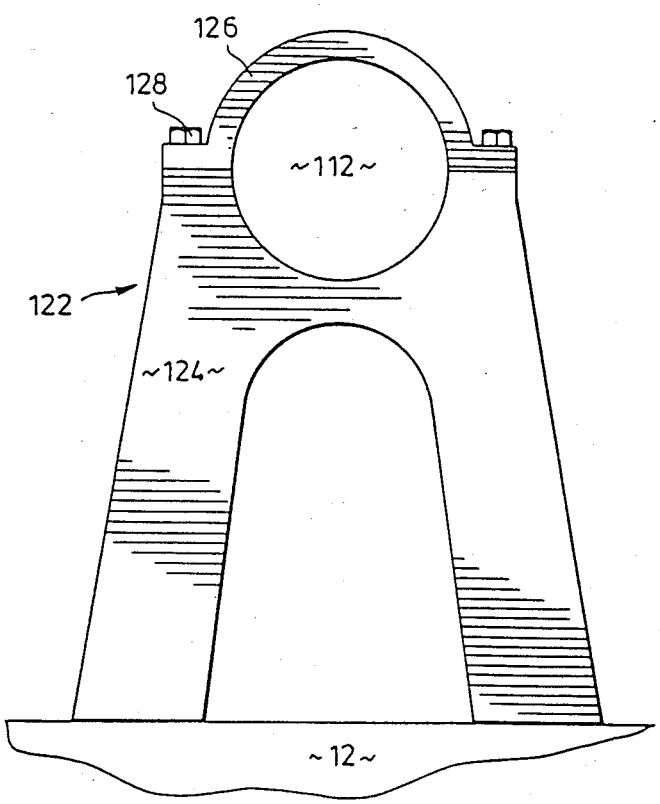

FIG. 2 is an enlarged view of a portion of the apparatus of FIG. 1 showing the electron gun assembly in greater detail, FIG. 3 is a view in the direction of arrow III of FIG. 1.

Referring now to the drawings, and in particular FIG. 1, a reactor 10 is mounted upon a cabinet 12 that houses a vacuum pump (not shown) having an inlet manifold 22 and control circuits (not shown). The reactor 10 includes a generally tubular housing 14 that tapers at its lower end to mate with an annular flange 16. The flange 16 is connected by bolts 18 to a similar flange 20 of the vacuum pump inlet manifold 22 so that the interior of the housing 14 is connected to the inlet of the vacuum pump for evacuation.

A pair of secondary housings 24, 25 of generally annular cross section intersects the housing 14 adjacent the flange 16 to define two secondary chambers 26, 28 within the reactor 10. The secondary chamber 26 is sealed by an inspection window 30 that permits the interior of the reactor 10 to be viewed.

The secondary chamber 28 terminates in a flange 32 to which is connected a mounting plate 34. The mounting plate 34 supports an electron gun assembly 36, a gas manifold 38 and a coolant manifold 40 respectively.

The electron gun assembly 36 includes a supporting arm 42 that is received within a sleeve 44 on the mounting plate 84 and contains a pair of coolant conduits 46 and electric supply cables 48. The arm 42 also supports, on brackets 50, the coolant manifold 40 that comprises a supply pipe 52 and return pipe 54. The pipes 52, 54 enter the housing 14 through a thin walled cylinder 56 to reduce heat flow and prevent cooling of O rings between the plate 34 and flange 32 that passes through the mounting plate 34. The pipes 52, 54 terminate in a cooling block 58 which has internal ducts to interconnect the pipes 52, 54 so that coolant may circulate through the block.

Mounted at the opposite end of the arm 42 to the mounting plate 34 is an electron gun 60, the details of which are best seen in FIG. 2.

The gun 60 comprises an L shaped hearth 62, the vertical portion 64 of which has a recess 66 to receive a slug of material to be vaporised. The horizontal portion 68 of hearth 62 is connected through an insulating block 69 to the end face of the arm 42 and has internal ducts to convey coolant from the conduits 46 to the vicinity of the recess 66.

A platform 70 is connected to the cooling block 58 and has a vertical leg 72 for connection to end face of the cooling block 58 and a generally horizontal leg 74 having an upwardly directed planar surface 76. A central aperture 78 is provided in the horizontal leg 74 through which the vertical portion 64 of the hearth extends with a clearance between the two components.

Mounted on the upwardly directed surface 76 and concentric with the aperture 78 is an annular sleeve 80 having a radially extending flange 82. The flange 82 carries a pair of diametrically opposed ceramic insulated terminals 84 which support a filament 86. The filament 86 extends around the periphery of the sleeve 80 and is made of two semi-circular pieces of tungsten wire that are interconnected at the terminals 84.

The flange 82 also carries an annular ceramic spacer 88 that is supported on the rim of the flange 82 radially outwardly of the terminals 84. The ceramic spacer 88 has a circumferential groove 90 on its upwardly directed face to receive the lower edge 92 of a focussing screen 94. The focussing screen 94 has a vertical peripheral wall 96 that terminates in a generally horizontal lip 98. The lip 98 is annular and is centred over the recess 66 in the hearth 62 to ensure free passage of vaporised metal from the hearth.

One of the cables, 48a, is connected to the hearth 62 and another denoted 48b is connected to one of the terminals 84 so that a high potential, typically between 1 and 10 kV exists between the filament 86 and the hearth 62 to heat the filament and induce the emission of electrons from it. The third of the electrical cables 48c is connected to the focussing screen 94 to supply a d.c. bias to the screen and thereby vary the focal point of electrons emitted from the filament 86 so that they impinge on the leading face of the material located in the recess 66.

The configuration of the screen ensures that electrons are focussed on the material in the recess 66 so that the material is heated to a high temperature and vaporises. As the material vaporises, the focal point of the electron beam is adjusted through the bias applied to the screen 94.

Referring once more to FIG. 1, the reactant manifold 38 is mounted above the electron gun assembly 36 and comprises a pipe 99 that extends through the mounting plate 34 and is formed at its opposite end into a ring 100 centred over the hearth 62. A large number of fine holes 102 are formed through the upwardly directed wall of the ring 100 to provide nozzles for the emission of a reactant from within the manifold. The reactant would normally be a gas although it is conceivable that a liquid or a solid may also be introduced through the manifold 38. The height of the manifold 38 may be varied by bending the pipe 99 to move the ring toward or away from the electron gun assembly 36.

Located between the screen 94 and ring 100 are a pair of annular radiation shields 95 that are supported by the cooling block 58. The shields are made of highly conductive material, such as copper or stainless steel and are maintained at a low temperature by the block 58 to inhibit heat transfer from the gun 36.

The housing 14 includes an access port 106 positioned above the secondary housing 24 and having an annular flange 108 to receive a heat pump assembly 110. The heat pump assembly 110 comprises a heat pump 112 which is a commercially available closed cycle helium refrigeration available from Air Products of Allentown, Pa. The pump 112 operates on the Joule Thompson effect and extracts heat in two stages. The pump 112 has a sleeve 116 extending forwardly from the housing 114 and the sleeve 116 is rotatably mounted in an annular flange 118 which is secured by bolts 120 to the flange 108. O-rings 122 are provided between the sleeve 116 and flange 118 to provide a seal whilst permitting rotation of the sleeve 116 relative to the housing 14. A cradle 122 is also provided for the heat pump 112 and extends upwardly from the casing 12. The cradle 122 is formed with a saddle 124 to support the heat pump 112 and a cap 126 that extends over the heat pump 112 to secure it to the saddle. The cap 126 and saddle 124 are connected by bolts 128 that may be slackened to permit rotation of the heat pump 112 in the saddle 124.

Extending from the front face of heat pump 112 is a pair of concentric tubular casings 130, 132 respectively that contain the first and second stages of the heat pump 112. The outer casing 130 terminates in a copper block 134 which serves as heat sink for the first stage and has a flange 136 at its inboard end.

A radiation shroud 138 is connected to the block 134 by means of a bracket 140. The bracket 140 comprises a bar 141 secured to the base 142 of shroud 138 and an arcuate strap 144 that is bolted to the flange 136. The base 142 is circular and has a side wall 146 depending from its periphery. The side wall terminates in a radial lip 150 that is detachably secured to the lower edge of side wall 146 to serve as a collection gutter and radiation shield. The side wall 146 includes an aperture 148 adjacent the strap 144 to accommodate the copper block 134 and permit the inner casing 132 to extend into the interior of the shroud 138.

The inner casing 132 terminates in a copper block 152 which serves as a heat sink for the second stage and has a radially extending flange 154 formed on it. The flange 154 mates with one leg 156 of an angle bracket 158 whose other leg 160 is secured to the base 162 of a reaction vessel 164. Bolts 166 connect the flange 154 to the angle bracket 158 so that the vessel 164 moves with the heat pump assembly 112.

The base 162 of collection vessel 164 is generally frusto conical and has side walls 168 depending from its periphery which terminate adjacent the radial lip 158.

The shroud 138 and collection vessel 164 are centred with respect to the hearth 64 and extend radially beyond the ring 100 so that vaporised metal and gas will be collected in the collection vessel 164.

The upper end of housing 14 is sealed by a hatch 170 that includes a viewing window 172 and a plurality of instruments such as a mechanical stirrer 174, a Schlenck syringe 176 and a triple jacketted temperature controlled product transfer tube 178. Each of the instruments is slidably mounted in a respective sleeve 180 and sealed by O-rings 182 so that the instruments may be inserted into or retracted from the interior of the housing 14.

Additional instruments are located within the housing 14 to monitor the operation of the reactor 10. These include a pair of thermocouples 184 mounted on opposite sides of the copper block 152 to record the temperature of the block and a quartz crystal micro balance 186 located between the hearth 62 and ring 100 to measure the mass of material vaporised by the electron gun assembly 36.

The operation of the reactor will now be described. The mounting plate 34 is initially released to remove the electron gun assembly 36 and the manifolds 38, 40. A specimen of the material to be vaporised is placed in the recess 64. The mounting plate 34 is replaced and the mounting arm manipulated to ensure that the hearth is accurately positioned on the centre line of the housing 14. Service connections are made to the coolant conduits 46 which circulate water through the internal ducting in the hearth 62. The coolant manifold 40 is connected to a supply of liquid nitrogen and the gas manifold connected to a supply of gas that has been selected for reaction with the material to be vaporised.

The heat pump 112 is positioned on the saddle 124 so that the collection vessel 164 is positioned over the hearth in the manner shown in FIG. 1. The vacuum pump in casing 12 is actuated and the interior of the housing evacuated to a pressure of about $10^{-6}$ Torr. The heat pump 112 is then activated to supply refrigerant to the copper blocks 134, 152 and extract heat from the interior of the housing 14. The heat pump is operated to lower the temperature of the shroud 138 and collection vessel 162. The first stage of the pump 112 acting through the heat sink provided by the copper block 134 is effective to reduce the temperature of the shroud 138 to about 77° K. The shroud 138 is formed from a highly conductive material such as copper and acts as a shield to inhibit the transfer of heat from housing 14 to the electron gun 60 to the collection vessel 164. The second stage of the pump 112 acts through the copper block 152 to extract heat from the collection vessel and the interior of the shroud. Because of the shielding offered by the shroud 138, the heat sink provided by copper block 152 is able to maintain the temperature of the collection vessel 164 at a predetermined temperature in the cryogenic range between 10° K. and 20° K. With the heat pump noted above it has been found that temperatures in the range 14° K. to 20° K. may be maintained but lower temperatures could be obtained if pumps of greater capacity were used. The collection vessel 164 is also made of highly conductive material such as copper so that a substantially uniform temperature is maintained over the interior surface of the vessel 164.

Upon the required temperatures and pressure being obtained, the reaction is started.

A high potential is applied between the filament 86 and the hearth 62 to induce the flow of electrons from the filament and the d.c. bias of the screen 94 adjusted to focus the electron beam onto the upper face of the material in the recess 66. The intense heat generated by the impingement of the electron beam vaporises material which issues as a plume toward the collection vessel 164. At the same time, the reactant is introduced into the manifold 38 and issues into the interior of the housing 14 through the holes 102 in ring 100. The reactant and vaporised material react as they impinge upon the interior surface of the collection vessel 164 to form the desired product. The temperature of the collection vessel 164 is chosen so that the product condenses on the base and side walls and is retained as a uniform solid condensate.

This procedure continues until sufficient material has been deposited on the collection vessel 164 with adjustments from time to time to the bias applied to the screen 94 to maintain the electron beam focussed on the leading edge of the material in the recess 66. During the vaporisation of the material it is essential that the pressure of the atmosphere within the screen 94 is maintained below a predetermined threshold for flow of electrons to continue. The introduction of the gas through the manifold 38 may locally raise the pressure and to avoid this a local low pressure zone is produced around the electron gun 50. This is achieved by means of the cooling block 58 which receives liquid nitrogen from the pipes 52, 54 and is therefore maintained at a low temperature. The platform 70 is attached to the cooling block 58 and is made from a highly conductive material such as copper so that the platform 70 acts as a heat sink. The zone around the hearth 62 is thus maintained at a relatively low temperature to depress the pressure of the atmosphere within the screen 94.

Upon completion of the deposition, the potential difference between the hearth 62 and filament 86 is terminated to stop the electron beam and the flow of gas from manifold 38 terminated.

The product is then made available for further experimentation by inverting the collection vessel 164 so that it faces the hatch 170. This is achieved by releasing the bolts 128 between the cap 126 and saddle 124 and rotating the heat pump 112 in the saddle. Rotation of the heat pump 112 also causes rotation of the sleeve 116 with the O-rings 122 maintaining the integrity of the seal between the heat pump assembly 110 and the housing 14. Because of the rigid connection between the shroud 148 and the block 134 and between the collection vessel 164 and block 152, rotation of the heat pump 112 will also cause rotation of the vessel and the shroud to the position indicated in chain dot lines in FIG. 1. After the collection vessel 164 is positoned to face the hatch 170 the bolts 128 are again tightened to hold the heat pump asembly 112 in a stable position.

Experiments may then be performed on the deposited material with the aid of the instruments slidably mounted in the hatch 170. For example a reactant may be introduced through the syringe 176 and stirred with the stirrer 174. Material within the vessel 164 may also be removed through product transfer duct 178 under closely controlled conditions.

The reactor enables the experiments to be conducted under closely controlled conditions such as under vacuum or in an inert atmosphere that is introduced into the housing 14.

The direct connection of the collection vessel 164 to the heat pump 112 also enables the temperature of the vessel 164 to be varied during experimentation to assist in the synthesis experiments.

After the experiments are completed, the vacuum in the housing may be released and the collection vessel 164 removed from the block 152 for cleaning. Access to the shield 138 and vessel 164 is obtained through the hatch 170 so that the securing bolts may be released without withdrawings the heat pump assembly 110. The collection vessel 164 may be unbolted from the flange 154 after the shield is removed.

The reactor 10 has particular utility in metal vapour synthesis and may be used to react metal atoms and or clusters with a suitable reactant to obtain a product. The reactions may be conducted at temperatures below liquid nitrogen temperature to produce product that would be unstable or difficult to prepare at higher temperatures.

The embodiments of the invention in which an exclusive property or privilege is claimed are defined as follows:

1. A reactor comprising a housing, means to permit within evacuation of said housing, means within said housing to locate a material, vaporising means to vaporise said material, collection means positioned above said location means to collect vaporised material on a surface thereof directed toward said location means, support means to support said collection means within said housing and heat extraction means to extract heat from said collection means and maintain said surface at a predetermined temperature, said support means permitting movement of said collection means from a first position in which said surface is directed toward said location means to a second position in which said surface is directed away from said location means whereby material deposited on said surface is supported in a stable manner when said surface is in said second position.

2. A reactor according to claim 1 wherein means are provided to introduce a reactant into said housing.

3. A reactor according to claim 2 wherein said reactant introduction means is located between said location means and said collection means.

4. A reactor according to claim 1 wherein a radiation shield is provided to inhibit the radiation of heat to said collection means.

5. A reactor according to claim 4 wherein said radiation shield is thermally connected to cooling means to maintain said radiation shield at a predetermined temperature.

6. A reactor according to claim 5 wherein said shield and said collection means are connected for conjoint movement.

7. A reactor according to claim 6 wherein said shield and said collection means are rotatable about a generally horizontal axis in moving said surface from said first to said second position.

8. A reactor according to claim 7 wherein said heat extraction means includes a heat pump assembly rotatably mounted on said housing and having a first cooling stage connected to said collection means and a second cooling stage connected to said shield.

9. A reactor according to claim 8 wherein said collection means and said shield are mounted on said heat pump assembly for movement therewith.

10. A reactor according to claim 9 wherein said collection means includes a dished vessel having a base and side walls depending from the periphery thereof.

11. A reactor according to claim 10 wherein said first cooling stage is connected to said base.

12. A reactor according to claim 10 wherein said shield includes a base and side walls depending therefrom, said side walls of said shield encompassing said dished vessel and being spaced from the side walls thereof.

13. A reactor according to claim 12 wherein said base of said shield is spaced from said base of said dished vessel and said first stage of said heat pump is located between said bases.

14. A reactor according to claim 13 wherein said shield includes a radially extending lip located at the lower edge of said side wall opposite to said base, said lip extending across the edge of said side wall of said dished vessel remote from said base.

15. A reactor according to claim 12 wherein a gas inlet is located between said location means and said collection surface and comprises a toroidal manifold having a plurality of nozzles formed therein, said nozzles being directed toward said surface.

16. A reactor according to claim 15 wherein said base of said dished vessel extends radially beyond said manifold.

17. A reactor according to claim 16 wherein said vaporising means comprises a hearth of said electron gun assembly.

18. A reactor according to claim 17 wherein said hearth is located on the axis of said toroidal manifold.

19. A reactor according to claim 18 including a heat sink to extract heat from the zone surrounding said hearth.

20. A reactor according to claim 19 wherein said heat sink comprises a platform supporting components of said electron gun assembly.

21. A reactor according to claim 20 wherein said heat sink is supplied with coolant to maintain extraction of heat from said zone.

22. A reactor according to claim 21 wherein said platform supports the focussing screen and filament of said electron gun assembly.

23. A reactor according to claim 1 including a plurality of instruments movably mounted on said housing and movable into proximity with said surface when said collection means is in said second position.

24. A reactor according to claim 23 wherein said instruments are retractable to permit movement of said collection means from said first to said second position.

25. A reactor according to claim 24 wherein said collection means rotate about a horizontal axis to move between said first and second positions.

26. A reactor according to claim 25 wherein said collection means includes a dished vessel having a base and side walls extending around the periphery of said base, said support means being connected to said base to rotate said vessel about said horizontal axis.

27. A reactor according to claim 26 wherein said dished vessel is located within a radiation shield to inhibit heat transfer to said collection means.

28. A reactor according to claim 27 wherein said radiation shield is conjointly moveable with said collection means about said horizontal axis.

29. A reactor according to claim 28 wherein said radiation shield is thermally connected to said heat extraction means.

30. A reactor according to claim 29 wherein said heat extraction means comprises a heat pump and said support means includes a pair of housings connected to said heat pump and containing first and second stages of said heat pump respectively said pump being rotatable about said horizontal axis to move said collection means between said first and second positions.

31. A reactor comprising a housing, means within said housing to support a material, vaporising means to vaporise said material, collection means mounted above said support means and having heat extraction means thermally connected thereto to maintain said collection means at a predetermined temperature below the condensation temperature of the product to be prepared, and gas introduction means to introduce a gas to react with said vaporised material prior to impingement of said vaporised material on said collection means, said gas and said vaporised material reacting to produce said product and said collection means condensing said product upon impingement therewith.

32. A reactor according to claim 31 wherein said collection means is invertable to support said product in a stable position.

33. A reactor according to claim 32 wherein said gas introduction means is located between said vaporising means and said collection means.

34. A reactor according to claim 33 wherein said vaporising means includes an electron gun and said support means for said material is a hearth associated with said gun.

35. A reactor according to claim 34 wherein said gas introduction means includes a toroidal manifold having a plurality of nozzles therein directed toward said collection means.

36. A reactor according to claim 35 including means to reduce locally the pressure of the atmosphere adjacent said electron gun assembly.

37. A reactor according to claim 36 wherein said pressure reduction means includes a heat sink located adjacent said electron gun assembly.

38. A reactor according to claim 37 wherein said heat sink supports components of said electron gun assembly.

39. A reactor according to claim 38 wherein said collection means is partially enclosed within a radiation shield to inhibit heat transfer from said housing to said collection means.

40. A reactor according to claim 39 wherein said radiation shield is thermally connected to said heat extraction means.

41. A reactor according to claim 40 wherein said collection means and said shield are conjointly movable during immersion of said collection means.

42. A method of preparing a product comprising the steps of vaporising a first material, reacting said first material with a vapour to form said product and collecting said product on a collection device maintained at a temperature below the condensation temperature of said vapours.

* * * * *